(12) United States Patent
Ito et al.

(10) Patent No.: US 9,329,100 B2
(45) Date of Patent: May 3, 2016

(54) LIFE ESTIMATION DEVICE AND LIFE ESTIMATION METHOD FOR ROLLING BEARING

(75) Inventors: Takashi Ito, Kuwana (JP); Takumi Fujita, Kuwana (JP)

(73) Assignee: NTN CORPORATION, Osaka (JP)

( * ) Notice: Subject to any disclaimer, the term of this patent is extended or adjusted under 35 U.S.C. 154(b) by 345 days.

(21) Appl. No.: 13/979,784

(22) PCT Filed: Jan. 12, 2012

(86) PCT No.: PCT/JP2012/050454
§ 371 (c)(1),
(2), (4) Date: Jul. 15, 2013

(87) PCT Pub. No.: WO2012/098979
PCT Pub. Date: Jul. 26, 2012

(65) Prior Publication Data
US 2013/0298704 A1    Nov. 14, 2013

(30) Foreign Application Priority Data

Jan. 17, 2011  (JP) ................................. 2011-006569

(51) Int. Cl.
*G01M 13/04*  (2006.01)

(52) U.S. Cl.
CPC ............ *G01M 13/04* (2013.01); *G01M 13/045* (2013.01)

(58) Field of Classification Search
None
See application file for complete search history.

(56) References Cited

U.S. PATENT DOCUMENTS

| | | |
|---|---|---|
| 5,336,338 A | 8/1994 | Toda |
| 7,559,240 B2 | 7/2009 | Iwatsubo et al. |
| 7,577,555 B2* | 8/2009 | Umeda et al. ..................... 703/2 |
| 7,813,906 B2 | 10/2010 | Shiromaru et al. |
| 2004/0249619 A1 | 12/2004 | Urakami et al. |
| 2005/0246150 A1 | 11/2005 | Shiromaru et al. |
| 2007/0277613 A1 | 12/2007 | Iwatsubo et al. |
| 2012/0109539 A1* | 5/2012 | Hasegawa et al. .............. 702/34 |

FOREIGN PATENT DOCUMENTS

| | | |
|---|---|---|
| CN | 1659427 | 8/2005 |
| JP | 5-271779 | 10/1993 |
| JP | 2002-257687 | 9/2002 |

(Continued)

OTHER PUBLICATIONS

Chinese Office Action dated Jan. 28, 2015 in corresponding Chinese Patent Application No. 201280005705.1.

(Continued)

*Primary Examiner* — Robert R Raevis (57) ABSTRACT

A lifetime estimation device to estimate a lifetime of a rolling bearing assembly comprising inner and outer rings includes a buildup height estimation unit to estimate in accordance with a predetermined rule a buildup height of the indentation based on the inputted depth of the indentation or the inputted indentation size; and a lifetime estimation unit to estimate the lifetime of the rolling bearing assembly, the lifetime estimation unit being configured to determine a preliminary estimate of the lifetime of the rolling bearing assembly based on a dynamic equivalent load, determine a rate of reduction in a rolling fatigue life based on the buildup height of the indentation, and apply the determined rate of reduction in a rolling fatigue life to the preliminary estimate of the lifetime of the rolling bearing assembly to determine an estimate of the lifetime of the rolling bearing assembly.

13 Claims, 7 Drawing Sheets

(56) References Cited

FOREIGN PATENT DOCUMENTS

| JP | 2003-121304 | 4/2003 |
| JP | 2004-003891 | 1/2004 |
| JP | 2005-134117 | 5/2005 |
| JP | 2005-140648 | 6/2005 |
| JP | 2005-291738 | 10/2005 |
| JP | 2009-229288 | 10/2009 |

OTHER PUBLICATIONS

U.S. Appl. No. 14/413,831, filed Jan. 9, 2015, Ito et al., NTN Corporation.

PCT International Preliminary Report on Patentability mailed Jul. 25, 2013 in corresponding International Application No. PCT/JP2012/050454.

Kazutoshi Toda et al., "Effect of Dent on Rolling Fatigue Life," Journal of Japanese Society of the Tribologists, vol. 38, No. 6, Jun. 15, 1993, pp. 48-54.

Yoshinobu Akamatsu, "Akkon Kitengata Hakuri Jumyo ni Oyobosu Akkon Size Oyobi Kaju no Eikyo," ("Effect of Indentation Size and Loadon Abrasion Lifetime of Indenation Originated Type"), Proceedings of JAST Tribology Conferenece Tottori 2004-11, Oct. 20, 2004, pp. 525-526.

Takashi Sada et al., "Akkon ni Kiin suru Tamajikuuke no Jumyo Teika" ("Lifetime Reduction of Ball Bearings Caused by Indentation"), 2003 Nendo Proceedings of the Spring Meeting of Japan Society of Precision Engineering, 5 Mar. 2003, pp. 589.

International Search Report mailed Mar. 6, 2012 in corresponding International Application No. PCT/JP2012/050454.

Chinese Office Action issued Jul. 8, 2015 in corresponding Chinese Patent Application No. 201280005705.1.

Extended European Search Report mailed Feb. 29, 2016 in related European Application No. 13816454.6.

\* cited by examiner

LIFE ESTIMATION DEVICE AND LIFE ESTIMATION METHOD FOR ROLLING BEARING

CROSS REFERENCE TO THE RELATED APPLICATION

This application is a U.S. national stage application of PCT/JP2012/050454 filed Jan. 12, 2012 and claims foreign priority benefit of Japanese patent application No. 2011-006569, filed Jan. 17, 2011, in the Japanese Intellectual Property Office, the entire disclosures of which are herein incorporated by reference as a part of this application.

BACKGROUND OF THE INVENTION

1. Field of the Invention

The present invention relates to a life estimation device and a life estimation method for a rolling bearing assembly, which are capable of accurately estimating the lifetime and the remaining lifetime of the rolling bearing assembly.

2. Description of Related Art

It has long been known that the lifetime of the rolling bearing assembly depends on various conditions such as including, for example, a working load, a lubricating condition, and materials used to form the rolling bearing assembly. The assessment of the lifetime of the bearing assembly has hitherto been carried out by the utilization of a mathematic calculation life formula that is formulated with due consideration paid to such conditions as, for example, the working load, information condition, and the materials used (See the non-patent document 1 listed below). This mathematic life calculation formula is currently used to estimate the period during which the rolling bearing assembly can be used in service when used under a certain condition, or to estimate the condition under which the rolling bearing assembly can be used without being accompanied by fracture during the required period of service. The rolling bearing assembly is generally used in service under the service condition that is stipulated according to the life formula and, accordingly, no problem ought to occur so long as the bearing assembly is used in service under the ordinary service condition.

It has however been found that the lifetime of the rolling bearing assembly is often of a controversial matter in the market. This appears to be because the rolling bearing assembly actually used is used in service under a condition different from the design condition and/or foreign matters admixed in a lubricating agent brings about an impairment such as, for example, an indentation or the like to a bearing surface layer. For these reasons, some methods have been suggested to estimate the remaining lifetime of the rolling bearing assembly in service. Those remaining lifetime estimation methods hitherto suggested in the art include, inter alia, an off-line method of a kind, in which a change in material of one of rolling bearing assemblies in service that has been sampled out is examined to assess the timing of replacement of the whole bearing assemblies such as discussed in the non-patent document 2 listed below, and an on-line method of a kind in which the conditions of use of the individual bearing assemblies are examined at the site of use thereof to assess the timing of replacement of the individual bearing assemblies such as discussed in any one of the patent documents 1 to 3 listed below.

As one of on-like remaining lifetime estimation methods, a method has been suggested in which the load on the bearing assembly in service, the number of rotations thereof, the condition of a lubricant oil and the size of an indentation formed by the foreign matter are estimated from values given out by various sensors so that the remaining lifetime of such bearing assembly may be estimated such as disclosed in the patent document 3 listed below. According to this method, the relationship between the indentation size and the lifetime of the rolling bearing assembly is expressed by the following formula.

$$L_{10}=L_{10c} \times 10^{(0.0038d\ log(P/C)-0.272\ log(d)+0.416)} \quad (1)$$

in which $L_{10}$ represents 10% lifetime (h), $L_{10c}$ represents the calculated lifetime (h), d represents the diameter of the indentation (μm), P represents the load (kgf), and C represents the dynamic load rating (kgf).

PRIOR ART DOCUMENTS

Patent Documents

[Patent Document 1] Japanese Patent No. 3880455
[Patent Document 2] Japanese Patent No. 3842055
[Patent Document 3] Japanese Patent No. 4504065

Non-Patent Documents

[Non-patent Document 1] Junzo Okamoto, "Korogarijikuuke to Korojikuuke no Doteki Fukayouryou—Lun Dl berg-Palmgren Riron no Shoukai—", Chiba Daigaku Kougaku-bu Kikai Kogaku Youso Kouza (1988), pp. 35-36 (Junzo Okamoto, "Dynamic Load Capacities of Rolling Bearings and Roller Bearings—Detailed Minutes on the Theory of Lun D l berg-Palmgren—", Lectures on Mechanical Elements at Chiba University, Department of Mechanical Engineering, Faculty of Engineering (1988), pp. 35-36)

[Non-patent Document 2] Noriyuki Tsushima, Kikuo Maeda, "Bearingu Enjinia", 49 (1984), pp. 25-34 (N. Tsushima et al., "Bearing Engineer", 49 (1984), pp. 25-34)

[Non-patent Document 3] Kazutoshi Toda, Tsuyoshi Mikami, Teruo Hoshino, "Toraiborojisuto", 6 (1993), pp. 526-532 (K. Toda et al, "Effect of Dent on Rolling Fatigue Life", Journal of Japanese Society of Toribologists, vol. 38, no. 6, 15 Jun. 1993 (15.06.1993), pages 48 to 54)

SUMMARY OF THE INVENTION

The formula (1) referred to above appears to indicate that the indentation size and the load are determinative of the lifetime of the rolling bearing assembly. It has, however, been found that considering that the lifetime of the rolling bearing assembly having an indentation formed therein is determined by the height of a buildup developed in the vicinity of the indentation (as discussed in the non-patent document 3 listed above), the relationship between the indentation size and the height of the buildup referred to above may not be uniquely fixed particularly where shapes of the foreign matters attributable to formation of the indentation are not uniform. Because of this, the lifetime of the rolling bearing assembly cannot be accurately estimated solely by the indentation size. Also, the lifetime of the rolling bearing assembly when the indentation is formed therein varies depending on the number of indentations and the surface area occupied by the indentation or indentations and, therefore, the lifetime of the rolling bearing assembly cannot be accurately estimated solely by the indentation size. As discussed above, not only the indentation size, but also the height of the buildup in the vicinity of the indentation, the number of indentations developed, the surface area occupied by the indentation or indentations and the load imposed on the rolling bearing assembly in service are all determinative of the lifetime of the rolling bearing assembly when the indentation is so formed, but no method of estimating the lifetime of the rolling bearing assembly in which those factors are taken into consideration has yet been made available.

In view of the foregoing, the present invention has for its primary object to provide a device for and a method of estimating the lifetime of the rolling bearing assembly, in which the lifetime of the rolling bearing assembly when an indentation is formed therein can be accurately estimated with due consideration paid to the height of the buildup in the vicinity of the indentation and other factors. For better understanding of the present invention, the present invention will be summarized below with the aid of reference numerals employed in the accompanying drawings to show component parts in a embodiment of the present invention.

The lifetime estimation device in accordance with the present invention is a lifetime estimation device for estimating the lifetime of a rolling bearing assembly including inner and outer rings 10 and 11, each ring having a respective rolling surface 10a and 11a defined therein, and a plurality of rolling elements 12 rollingly interposed between the respective rolling surfaces 10a and 11a of the inner and outer rings 10 and 11. The lifetime estimation device of the kind referred to above includes a buildup height estimation unit 7 to receive an input indicating depth h2 of an indentation 14, which is formed in one of the rolling surfaces 10a and 11a of the inner and outer rings 10 and 11, or a size D1 of the indentation 14 that represents a planar size so as to estimate, in accordance with a predetermined rule, the height h1 of a buildup of the indentation 14 as measured from the rolling surface 10a or 11a where such indentation 14 has been formed based on the inputted depth of the indentation or the indentation size, and a lifetime estimation unit 8 for estimating the lifetime of the rolling bearing assembly in accordance with the rule determined by a relationship between the estimated buildup height h1 of the indentation and the rate of reduction in a rolling fatigue life and a dynamic equivalent load. It is to be noted that the planar indentation size 14 referred to above is intended to mean the length such as, for example, the diametrical dimension of or the surface area of the indentation as viewed in a plane and is, for example, represented by the maximum diametrical dimension of the indentation 14 if the indentation 14 when viewed in a plane is of a round shape, or, represented by a value, which is twice the distance from a substantially center portion of the indentation 14 to the maximum outer peripheral edge thereof, if the indentation 14 when viewed in a plane is of a non-round shape.

It has been known in the art that the lifetime of the rolling bearing assembly can be estimated from the dynamic equivalent load. On the other hand, the lifetime of the rolling bearing assembly under a condition that the foreign matter may admix in the bearing assembly is shorter than the estimated lifetime because of the stress concentration occurring in a buildup portion in the vicinity of the indentation brought about by the foreign matter. Because of it, the need has been recognized to correct the lifetime of the rolling bearing assembly when the indentation 14 is formed in at least one of the respective rolling surfaces 10a and 11a of the inner and outer rings 10 and 11. Also, in the bearing assembly actually used, it is difficult to directly measure the buildup height h1 of the indentation 14 at the initial stage of formation of the indentation. This is because the buildup height h1 of the indentation 14 tends to be reduced as a result of the plastic deformation during the rolling. Accordingly, where the lifetime of the bearing assembly is to be estimated, it is necessary to estimate the buildup height h1 of the initial indentation 14 formed in the bearing assembly actually used.

The applicant of the present invention has conducted extensive studies to determine the relationship between the depth h2 of the indentation 14 and the buildup height h1 of the indentation 14 and the relationship between the indentation size D1 and the buildup height h1 of the indentation 14 while indentations 14 of different shapes had been formed in the raceway surfaces 10 and 11. As a result, it has been found that the buildup height h1 of the indentation 14 has a propensity of increasing linearly with increase of the depth h2 of the indentation 14 and such propensity does not change in dependence with the shape of the indentation. This has provides an indication that the buildup height h1 of the indentation 14 can be primarily estimated from the depth h2 of the indentation 14.

On the other hand, with respect to the relationship between the indentation size D1 and the buildup height 1 of the indentation 14, it has been found that although a linear relationship similar to the relationship between the depth h2 of the indentation 14 and the buildup height h1 of the indentation 14 has been found, such linear relationship varies depending on change in shape of the indentation. The buildup height estimation unit 7 employed in this construction estimates the buildup height h1 of the indentation 14, as measured from the rolling surfaces 11a and 11b, from the depth h2 of the indentation 14, formed in the rolling surfaces 10a and 11a, or the indentation size D1 in accordance with the predetermined rule. Also from the result of tests conducted, the buildup height h1 of the indentation 14 and the lifetime of the rolling bearing are assumed to have a certain relationship therebetween and the lifetime estimation unit 8 estimates the lifetime of the rolling bearing assembly from the relationship between the buildup height h1 of the indentation, estimated by the buildup height estimation unit 7, and the rate of reduction of the rolling fatigue life and the dynamic equivalent load. Accordingly, the lifetime of the rolling bearing assembly when the indentation 14 is formed in the rolling surfaces 10a and 11a can be accurately estimated.

The buildup height estimation unit 7 referred to above may include a storage section 7a for storing the relationship between the indentation size D1 and the buildup height h1 of the indentation 14 under particular conditions of use of the bearing assembly and a calculation section 7a for calculating the buildup height h1 of the indentation 14 by comparing the inputted buildup size D1 with the relationship stored in the storage section 7a. The relationship between the indentation size D1 and the buildup height h1 of the indentation 14 changed depending on the shape of the indentation 14 and/or the rolling condition, that is, the particular condition of use of the bearing assembly. Accordingly, the relationship between the indentation size D1 under the particular condition of use of the bearing assembly and the buildup height h1 of the indentation 14 is stored in the storage section 7a and the buildup height h1 of the indentation 14 can be calculated by causing the calculation section 7b to compare the inputted indentation size D1 with the relationship stored in the storage section 7a.

The lifetime estimation unit 8 referred to above may include a lifetime calculation section 8a for calculating the lifetime of the rolling bearing assembly by multiplying the estimated lifetime of the rolling bearing assembly by a correction coefficient of the rolling fatigue life depending on an increase of the surface area of the buildup portion of the indentation 14 which is expressed by the following formula.

$$a_r = (1/n_d)^e$$

in which $a_v$ represents a correction coefficient depending on the indentation size and the number of the indentations, $n_d$ represents the rate of increase of the surface area of the buildup portion of the indentation and, e represents the Weibull slope (e=10/9 in the case of a ball bearing assembly and e=9/8 in the case of a roller bearing assembly).

Considering that the capacity that may be loaded increases particularly where the indentation 14 of a large size is formed in the rolling surfaces 10a and 11a or the number of the indentations 14 increases, the lifetime of the rolling bearing assembly appears to be shortened. Accordingly, the lifetime calculation section 8a referred to above multiplies the estimated lifetime by the correction coefficient so that the capacity that is loaded may be taken into consideration. By so doing, the lifetime in accord with the capacity that is loaded can be estimated.

If the lifetime estimation unit 8 includes the lifetime calculation section 8a referred to above, the lifetime calculation section 8a may be so designed as to calculate the lifetime of the rolling bearing assembly by multiplying the lifetime, which has been estimated on the basis of the maximum buildup height h1 of the indentation 14, by the correction coefficient referred to above. In the rolling surfaces 10a and 11a of the inner and outer rings 10 and 11 employed in the rolling bearing assembly actually used, indentations 14 having respective buildup heights h1 of the indentation 14 are distributed. In order to take this into account, two concepts are needed in estimating the lifetime of the rolling bearing assembly. One of those concepts is that, on the assumption that the lifetime of the rolling bearing assembly is substantially determined by the indentation having the maximum buildup height h1, the estimated lifetime is corrected with due consideration paid to only the indentation 14 having the buildup height h1 near to the maximum value. The remaining concept is that, on the assumption that there is the probability of impairment against all of the indentations 14, the estimated lifetime is corrected with the aid of the probabilistic multiplication theorem so that all of those indentations 14 may be taken into account. Either of those concepts is effective to correct the estimated lifetime.

If the lifetime estimation unit 8 includes the lifetime calculation section 8a referred to above, the lifetime calculation section 8a may be so designed as to calculate the lifetime of the rolling bearing assembly by estimating an individual indentation responsive lifetime for each indentation 14 on the basis of the buildup height h1 of all of the indentations 14 formed on the rolling surfaces 10a and 11a and then to calculate the lifetime of the rolling bearing assembly and then multiplying the individual indentation responsive lifetime, which has been so estimated, by the correction coefficient referred to above.

The lifetime estimation unit 8 referred to above may be of a type which may calculate the lifetime $L_n$ of the rolling bearing assembly with the use of the following formula.

$$L_n = a_d a_1 (C/P)^p$$

in which $a_d = e^{(-b \times h)}$ and $a_1 = [(\ln(1-0.01 \text{ n})/\ln 0.9]^{1/e}$ and in which $L_n$ represents n % lifetime, $a_d$ represents the indentation correction coefficient, b represents a constant, h represents the indentation buildup height (µm), $a_1$ represents the reliability coefficient, P represents the load (kgf), C represents the dynamic load rating (kgf), p represents the loaded lifetime index (p=3 in the case of the ball bearing assembly and p=10/3 in the case of the roller bearing assembly), and e represents the Weibull slope (e=10/9 in the case of a ball bearing assembly and e=9/8 in the case of a roller bearing assembly, except in the case of 10% lifetime or lower in which e=1.5).

Alternatively, the lifetime estimation unit 8 referred to above may be of a type which may calculate the lifetime $L_n$ of the rolling bearing assembly with the use of the following formula. In this case, a further highly accurate estimated lifetime can be determined.

$$L_n = a_d a'_1 (C/P)^p$$

in which $a_d = e^{(-b \times h)}$ and $a'_1 = \{0.95 \times [\ln(1-0.01 \text{ n})/\ln 0.9]^{1/e+0.05}\}$ and in which $L_n$ represents n % lifetime, $a_d$ represents the indentation correction coefficient, b represents a constant, h represents the indentation buildup height (µm), $a_1$ represents the reliability coefficient, P represents the load (kgf), C represents the dynamic load rating (kgf), p represents the loaded lifetime index (p=3 in the case of the ball bearing assembly and p=10/3 in the case of the roller bearing assembly), and e represents the Weibull slope (e=10/9 in the case of a ball bearing assembly and e=9/8 in the case of a roller bearing assembly, except in the case of 10% lifetime or lower in which e=1.5).

When the buildup height estimation unit 7 determines that the buildup height h1 of the indentation 14 is smaller than 1.0 µm, the lifetime estimation unit 8 may be of a type capable of calculating the lifetime $L_n$ of the rolling bearing assembly in which the parameter $a_d$ is equal to 1. Since no exfoliation of an indentation induced type does not occur in the case of the indentation 14 having the buildup height h1 of the indentation 14 smaller than 1.0 µm, the estimated lifetime is not affected adversely. Accordingly, when the indentation correction coefficient $a_d$ is chosen to be 1, it becomes possible to calculate the lifetime of the rolling bearing assembly with no substantial correction efficient added.

The lifetime estimation unit 8 may include a remaining lifetime calculation section 8b for estimating the remaining lifetime of the bearing assembly from the lifetime of the rolling bearing assembly, which has been so estimated as described above, and the number of rotations of the bearing assembly. In a relatively expensive rolling bearing assembly of a large size, the desire has been arisen that the remaining lifetime can be estimated through a regular servicing inspection and the bearing assembly be continually used in service based on the result so obtained. The remaining lifetime calculation section 8b referred to above estimates the lifetime from the dynamic equivalent load and the buildup height h1 of the indentation 14 and then the remaining lifetime from the number of rotations of the bearing unit. From the result of this estimation, it is possible to determine whether the bearing assembly can be continually used in service or whether such bearing assembly be replaced.

The remaining lifetime calculation section 8b referred to above may be of a type capable of determining that the remaining lifetime is zero revolution in the event of the number of rotations which exceeds the lifetime having an cumulative failure probability of lower than 10%. Since the lifetime of the rolling bearing assembly is often based on the parameter $L_{10}$ (the number of rotations at which 90% of the rolling bearing assemblies has not yet been failed), the remaining lifetime at that time is generally assumed as the value represented by the number of rotations subtracted from the parameter $L_{10}$. If the timing, at which the remaining lifetime based on the parameter $L_{10}$ comes to represent a negative (−) value, is determined as the time of replacement of the rolling bearing assembly, 90% of the group of the rolling bearing assemblies being checked out may be regarded as acceptably operated. In the rolling bearing assemblies, there is an application thereof in which failure of a small percentage of the rolling bearing assemblies will come to a controversial issue. In this case, it is recommended that the cumulative failure probability should be set to a value lower than 10%. It is to be noted that the rolling bearing assemblies referred to above may be either a tapered roller bearing assembly or a cylindrical roller bearing assembly.

The lifetime estimation method for the rolling bearing assembly that is designed in accordance with the present invention is a lifetime estimation method of estimating the lifetime of the rolling bearing assembly of a type including inner and outer rings 10 and 11, each having a respective rolling surface 10a and 11a defined therein, and a plurality of rolling elements 12 interposed between the respective rolling surfaces 10a and 11a of the inner and outer rings 10 and 11. This lifetime estimation method includes a buildup height estimating step S2a of determining, while the depth h2 of an indentation 14, which is formed in one of the rolling surfaces 10a and 11a of the inner and outer rings 10 and 11, or the size D1 of the indentation 14 that represents the planar size is inputted, the buildup height h1 of a buildup of the indentation 14, as measured from the rolling surface 10a or 11a where such indentation 14 has been formed, in accordance with a predetermined rule, and a lifetime estimating step S2b of estimating the lifetime of the rolling bearing assembly in accordance with the relationship between the buildup height h1 of the estimated indentation and the rate of reduction of the rolling fatigue life and the dynamic equivalent load.

During the execution of the buildup height estimating step S2a, the buildup height h1 of the indentation 14, as measured from the rolling surface, is estimated in accordance with the predetermined rule from the depth of the indentation 14, formed in the rolling surfaces 10a and 11a, or the indentation size D1. Also, from the result of tests, the buildup height h1 of the indentation 14 and the lifetime of the rolling bearing assembly are assumed to have a certain relationship and, during the execution of the lifetime estimating step S2b, the lifetime of the rolling bearing assembly is determined from the relationship between the buildup height h1 of the indentation 14, which has been estimated during the buildup height estimating step S2a, and the rate of reduction of the rolling fatigue life and the dynamic equivalent load. Accordingly, the lifetime of the rolling bearing assembly at the time the indentation 14 is formed in the rolling surfaces 10a and 11a can be accurately estimated.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF EMBODIMENTS

Figure 6A:
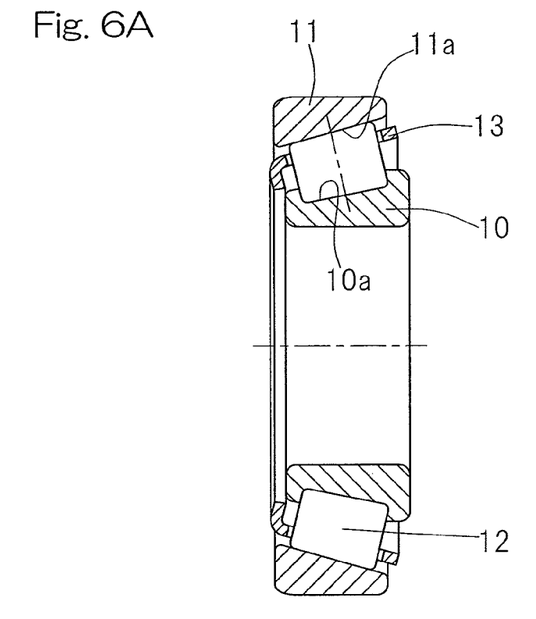
FIG. 6A is a longitudinal sectional view of a tapered roller bearing assembly, which is one of rolling bearing assemblies.
Figure 6B:
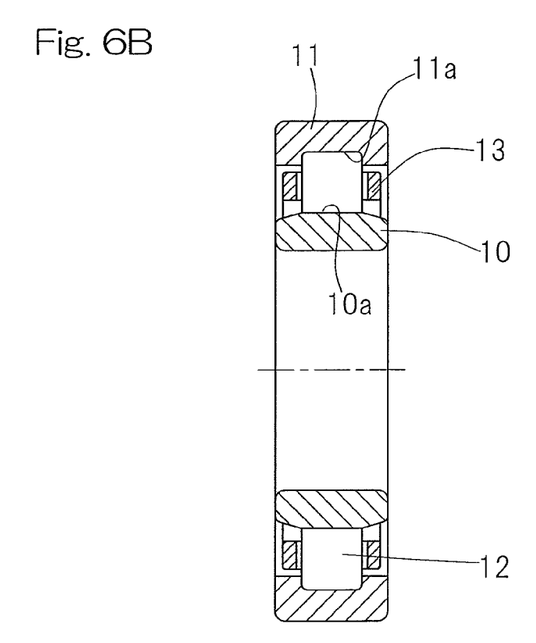
FIG. 6B is a longitudinal sectional view of a cylindrical roller bearing, which is another one of the roller bearing assemblies.

A first embodiment of the present invention will now be described in detail with particular reference to FIGS. 1A and 1B to FIGS. 6A and 6B. A lifetime estimation device for a rolling bearing assembly according to this embodiment is a device for estimating a lifetime or a remaining lifetime of for example, a tapered roller bearing assembly, best shown in FIG. 6A, or a cylindrical roller bearing assembly, best shown in FIG. 6B, with the use of a computer or the like. As shown in FIGS. 6A and 6B, the rolling bearing assembly includes inner and outer rings 10 and 11, each having a rolling surface 10a and 11a defined therein, a plurality of rolling elements 12 interposed between the respective rolling surfaces 10a and 11a of the inner and outer rings 10 and 11, and a retainer 13 for retaining the rolling elements 12. It is, however, to be noted that the rolling bearing assembly referred to above may be either an angular contact ball bearing assembly or a deep groove ball bearing assembly. The description that follows is to be understood as containing the description on a lifetime estimation method for the rolling bearing assemblies.

Figure 1A:
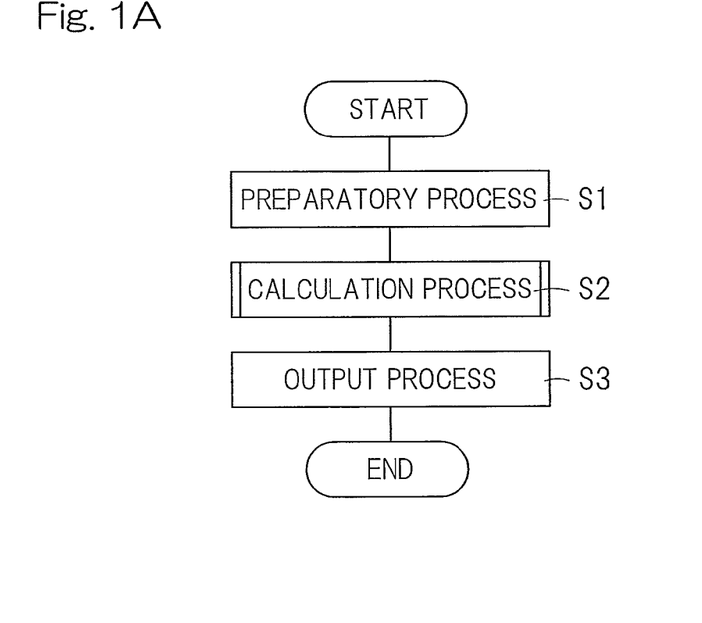
FIG. 1A is a flowchart showing a sequence of a lifetime estimation method for a rolling bearing assembly according to a first embodiment of the present invention.
Figure 1B:
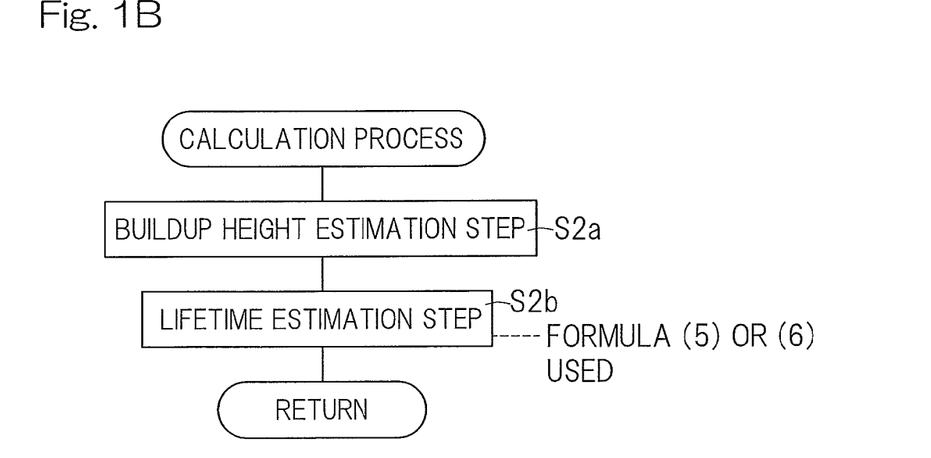
FIG. 1B is a flowchart showing a subroutine of a calculation step shown in FIG. 1A.

FIG. 1A illustrates a flowchart showing the sequence of steps of the life estimation method for the rolling bearing assembly according to this embodiment. This life estimation method for the rolling bearing assembly shown therein includes a preparatory process S1 during which various data necessary to estimate the lifetime are stored in a storage section as will be described later, a calculation process S2 during which the lifetime of the bearing assembly is calculated with the use of values so prepared, and an output process S3 during which a result of the calculation is outputted. As shown in FIG. 1B, the calculation process S2 referred to above includes a buildup height estimation step S2a during which the buildup height h1 as measured from the rolling surfaces 10a and 11a is estimated from the depth h2 of an indentation 14, which has been formed in one of the respective rolling surfaces 10a and 11a of the inner and outer rings 10 and 11, or an indentation size, and a lifetime estimation step S2b of estimating the lifetime of the rolling bearing assembly from a relationship between the estimated buildup height h1 of the indentation 14 and the rate of reduction of the rolling fatigue life, and a dynamic equivalent load.

Figure 2:
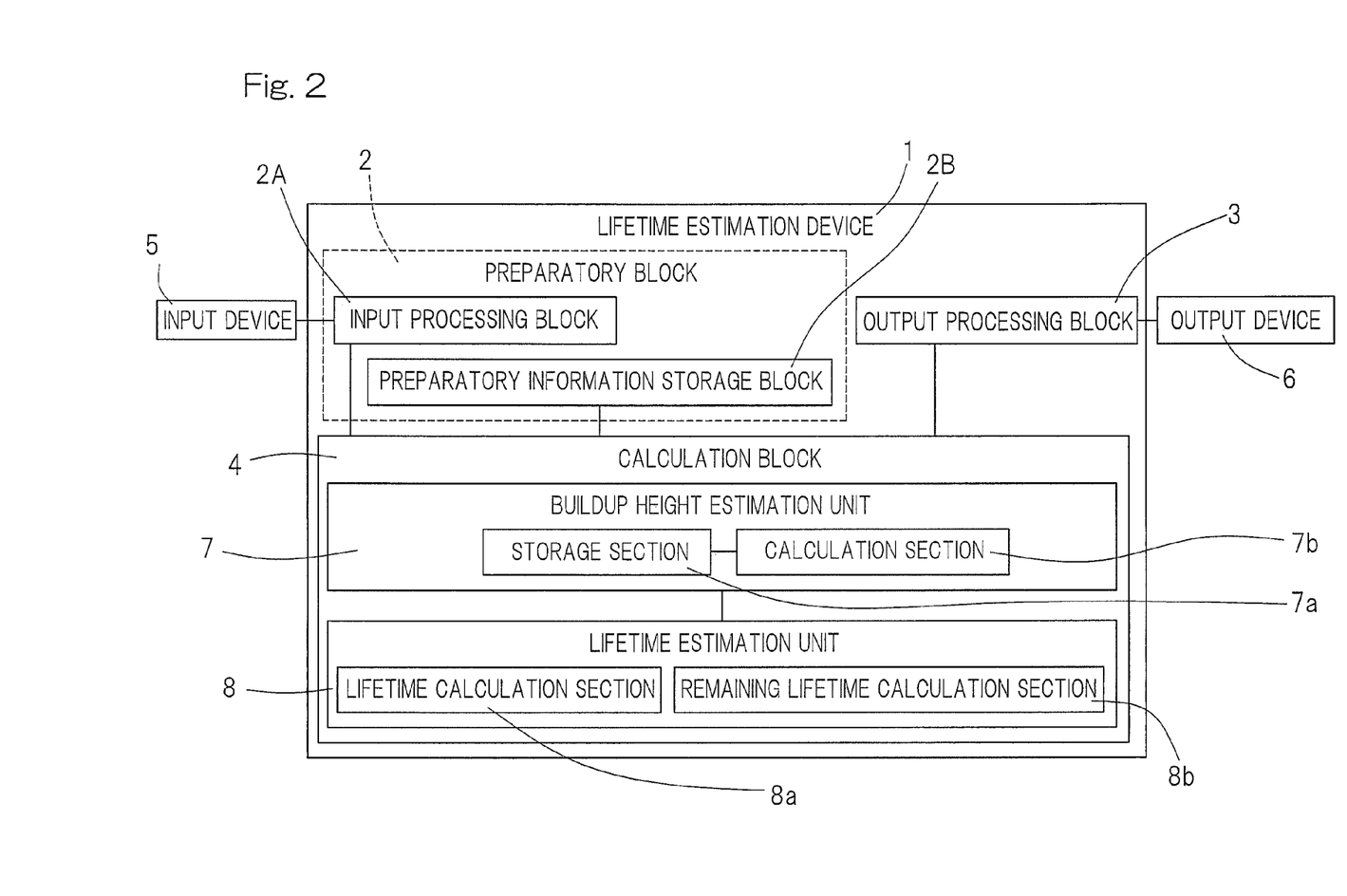
FIG. 2 is a block diagram showing a conceptual construction of a lifetime estimation device for the rolling bearing assembly according to such embodiment.

FIG. 2 is a block diagram illustrative of a conceptual construction of the lifetime estimation device for the rolling bearing assembly. The lifetime estimation device 1 shown therein includes a central processing unit (CPU), which is not shown, and a storage section such as, for example, a memory or the like and, by means of a hardware (including an operating system) of the life estimation device 1 and a lifetime estimation program executed by the lifetime estimation device 1 constitute various blocks shown as schematic structures in FIG. 2, that is, an input processing block 2A of a preparatory block 2, a preparatory information storage block 2B, an output processing block 3, and a calculation block 4 are constituted. The preparatory information storage block 2B is constituted by, for example, a storage area which is a portion of the storage section equipped in the lifetime estimation device 1. The lifetime estimation device 1 is provided with an input device 5 and an output device 6. The input device 5 may be in the form of, for example, a keyboard, a pointing device, a communication equipment or a readout device for a storage element or the like. The output device 6 is comprised of a display, a printer and/or a communication equipment or the like.

The preparatory block 2 includes the input processing block 2A and the preparatory information storage block 2B. The input processing block 2A is operable of inputting various data necessary for the calculation and storing them in the preparatory information storage block 2B. Other than a function of storing the input data, as they stand, in the preparatory information storage block 2B, the input processing block 2A referred to above may have an additional or alternative function of performing a calculation of the inputted data, which is a preprocess for calculation performed by the calculation block 4, and then storing a result of such calculation in the preparatory storage section 2B.

Referring to FIG. 1A, the preparatory process S1 referred to previously is a process of storing in the preparatory information storage block 2B of FIG. 2, various pieces of information which are used in estimating the lifetime of the rolling bearing assembly. Those pieces of information may include a reliability coefficient, a load, a dynamic load rating, a loaded lifetime index, a Weibull slope, a constant of an indentation correction coefficient and others. The preparatory block 2 shown in FIG. 2 is operable to perform the preparatory process S1 shown in FIG. 1A. The process of storing the various pieces of information in the preparatory information storage block 2B may be accomplished by inputting those pieces of information from the input device 5 or, alternatively, with respect to some of those pieces of information, after they have been determined from the inputted pieces of information by means of the calculation performed by the input processing block 2A, values so determined may be stored in the preparatory information storage block 2B.

The calculation block 4 shown in FIG. 2 is operable to perform the process of the calculation step S2 shown in FIG. 1A and includes the buildup height estimation unit 7 and the lifetime estimation unit 8. The buildup height estimation unit 7 referred to above is operable to perform the process of the buildup height estimation step S2a shown in FIG. 1B and the lifetime estimation unit 8 is operable to perform the process of the lifetime estimation step S2b. In this instance, the lifetime of the rolling bearing assembly is generally expressed by the following formulas.

$$L_n = a_1(C/P)^p, \quad (2)$$

in which $a_1 = [\ln(1-0.01 n)/\ln 0.9]^{1/e}$ $$L_n = a'_1(C/P)^p, \quad (3)$$

in which $a'_1 = \{0.95 \times [\ln(1-0.01 n)/\ln 0.9]^{1/e} + 0.05\}$ where $L_n$ represents n % lifetime, $a_1$ represents the reliability coefficient, P represents the load (kgf), C represents the dynamic load rating (kgf), p represents the loaded lifetime index (p=3 in the case of the ball bearing assembly and p=10/3 in the case of the roller bearing assembly), and e represents the Weibull slope (e=10/9 in the case of the ball bearing assembly and e=9/8 in the case of the roller bearing assembly), it being however to be noted that e=1.5 for 10% lifetime or lower.

It will readily be seen that from the formulas (2) and (3) referred to above, the lifetime of the rolling bearing assembly can be estimated from the dynamic equivalent load. It is to be noted that the formula (2) referred to above, has been utilized until the 1990s while the formula (3) referred to above is a formula which has recently been standardized and is utilized to calculate the estimated lifetime more accurately than that calculated by the formula (2). The dynamic equivalent load referred to previously means a certain central axial load, imposed on the bearing assembly, or a static radial load, imposed on the bearing assembly, whichever is of a kind capable of providing the lifetime similar to the lifetime of the bearing assembly that is achieved under an actual loaded condition, and stands for that expressed by only a radial or axial component particularly where both of the radial load and the axial load act simultaneously on the bearing assembly. The lifetime of the rolling bearing assembly under a condition in which the foreign matter tends to admix into the bearing assembly becomes smaller than the lifetime expressed by the formulas (2) and (3) by reason of the stress concentration occurring at a buildup height portion 15 in portions of the rolling surfaces 10a and 11a in the vicinity of the indentation 14 shown in FIG. 4B as will be referred to later. Accordingly, each of the formulas (2) and (3) need be multiplied by the indentation correction coefficient, which is used to correct the lifetime of the rolling bearing assembly when the indentation 14 is formed.

Figure 3:
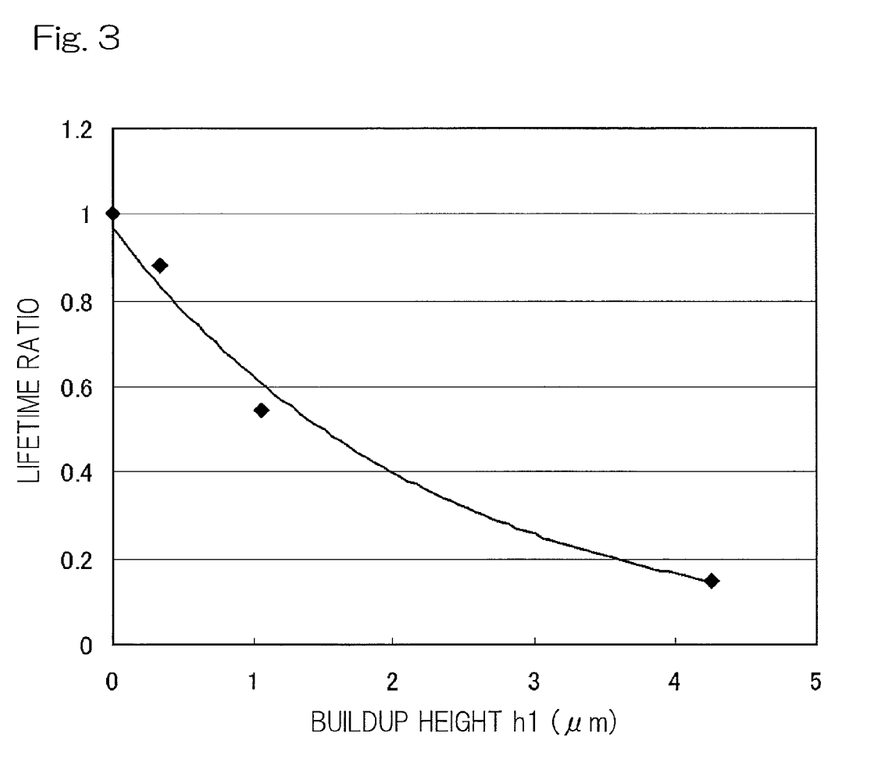
FIG. 3 is a chart showing the relationship between the buildup height of an indentation and the rate of reduction of the rolling fatigue lifetime.
Figure 4A:
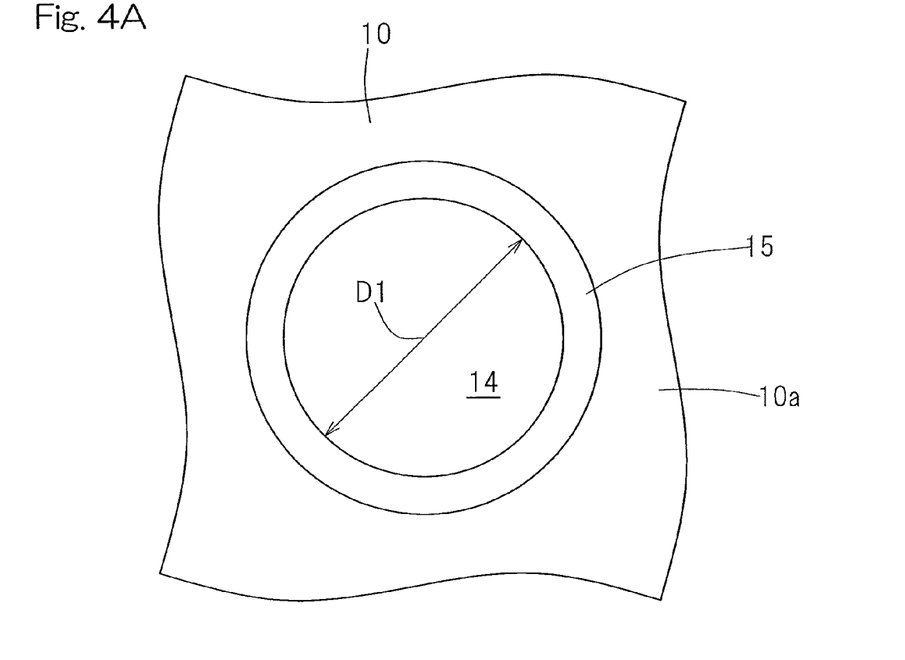
FIG. 4A is a top plan view showing the indentation in a raceway ring as viewed on an enlarged scale.
Figure 4B:
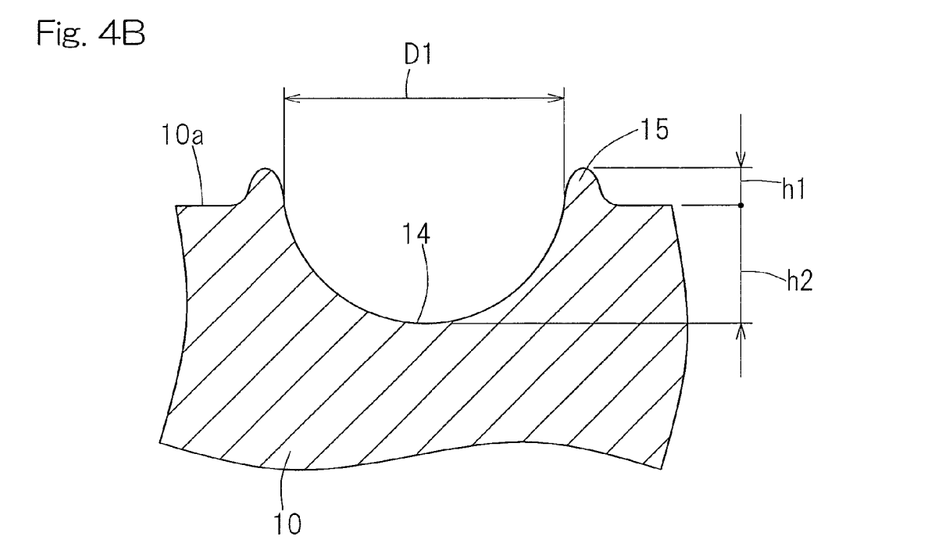
FIG. 4B is a longitudinal sectional view showing a buildup height portion in the vicinity of the indentation in the raceway ring.

The chart shown in FIG. 3 illustrates the relationship between the buildup height h1 of the indentation 14, shown in FIGS. 4A and 4B which are referred to later, and the lifetime of the rolling bearing assembly. In FIG. 3, the bearing lifetime of the bearing assembly, having no buildup height portion 15 formed on the raceway ring rolling surfaces 10a and 11a of the bearing assembly which results from the indentation 14 as shown in FIGS. 6A and 6B, was first determined by means of a series of experiments. Then, with respect to the bearing assembly having such an indentation 14 as shown in FIGS. 4A and 4B, the bearing lifetime that is relative to the previously described bearing lifetime was determined using the same test condition as that used to determine the previously described bearing lifetime. During the series of tests conducted, when the rolling surface of a raceway ring, which is either one of the inner and outer rings, is exfoliated, for example, when a detection value provided by a vibration sensor or the like attains a value equal to or higher than a predetermined threshold value, a computer or a test attendant worker determines that the bearing assembly being tested has come to the end of the lifetime. The test conditions referred to above are such as shown in the following Table 1.

TABLE 1

| Test Conditions | |
|---|---|
| Bearing Assembly Tested | Tapered roller bearing assembly |
| Dimensions (Inner dia., Outer dia., and Width) | φ 30 mm × φ 62 mm × 17.25 mm |
| Radial Load | 17.65 kN |
| Axial Load | 1.47 kN |
| Rotation Speed of Shaft | 2,000 min$^{-1}$ |

If it is assumed, based on the results shown in the chart of FIG. 3, that the buildup height h1 of the indentation 14 and lifetime of the rolling bearing assembly have such a relationship as expressed by an exponential function, each of the formulas (2) and (3) requires correction by multiplying the following indentation correction coefficient.

$$a_d = e^{(-b \times h)} \quad (4)$$

in which $a_d$ represents the indentation correction coefficient, b represents a constant, and h represents the buildup height of the indentation (μm).

The formula (4) referred to above is only for the purpose of illustration and the form of such formula may be expressed by, for example, a proportional expression, a polynominal expression or any other form. Also, as expressed by the formula (1) above, the lifetime of the rolling bearing assembly when the indentation 14 is formed in the raceway ring rolling surfaces 10a and 11a, if considered variable in dependence on the load, may be expressed by the following form of the formula.

$$L_{10} = L_{10c} \times 10^{(0.0038d \, \log(P/C) - 0.272 \, \log(d) + 0.416)}$$

in which $L_{10}$ represents 10% lifetime (h), $L_{10c}$ represents the calculated lifetime (h), d represents the indentation diameter (μm), P represents the load (kgf), and C represents the dynamic load rating (kgf).

From the foregoing, the lifetime of the rolling bearing assembly, when the indentation 14 is formed in the rolling surfaces 10a and 11a, can be estimated from the following formulas (5) and (6), in which the formulas (2) and (3) are multiplied by the indentation correction coefficient that is expressed by the formula (4) above. Accordingly, the lifetime estimation unit can execute a process of the lifetime estimating step by means of the formula (5) or the formula (6).

$$L_n = a_d a_1 (C/P)^p \quad (5)$$

$$L_n = a_d a'_1 (C/P)^p \quad (6)$$

Considering that in this instance, with the indentation 14 of a small size of not greater than 1.0 μm in buildup height h1 of the indentation 14, no exfoliation of an indentation induced type did not occur in the rolling surfaces 10a and 11a, the indentation correction coefficient expressed by the formula (4) and others need not be taken into consideration in the case of the indentation of a size having the buildup height h1 of the indentation 14 that is not greater than 1.0 μm. In other words, the lifetime of the rolling bearing assembly is estimated with the indentation correction coefficient being taken as 1.

In the case of a bearing assembly actually being used, it is difficult to directly measure the buildup height h1 of the indentation 14 at the initial stage of formation of the indentation. This is because the buildup height h1 of the indentation 14 tends to decrease as a result of the plastic deformation taking place during the rolling. Accordingly, in estimating the lifetime of the bearing assembly according to the formula (5) or the formula (6), a method of estimating the buildup height h1 of the indentation 14 at the initial stage, which is formed in the raceway ring of the bearing assembly actually used, is needed.

Here, FIG. 4A illustrates a top plan view showing, on an enlarged scale, the indentation 14 in the rolling surface 10a of the raceway ring, for example, the inner ring 10 and FIG. 4B illustrates a longitudinal sectional view showing the buildup height portion 15 in the vicinity of the indentation in the raceway ring shown in FIG. 4A. The buildup height portion 15 referred to above represents a shape of an annular projection protruding from a portion of the raceway surface 10a adjacent the indentation 14. The buildup height portion 15 has a buildup height h1 which is represented by the maximum buildup height, as measured from the rolling surface 10a, of the annular projection. The depth h2 of the indentation 14 is represented by the maximum depth position of the indentation 14 as measured from the rolling surface 10a. The indentation size is indicated by the maximum diametric dimension D1 of the indentation 14 particularly where the indentation 14, when viewed in a plane, represents a round shape.

Figure 5A:
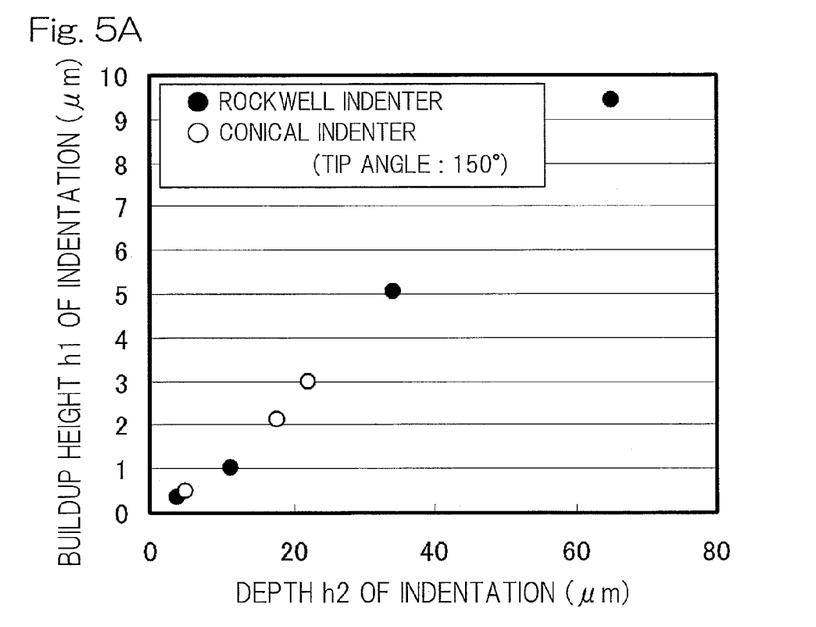
FIG. 5A is a chart showing the relationship between the depth of the indentation and the buildup height of the indentation.
Figure 5B:
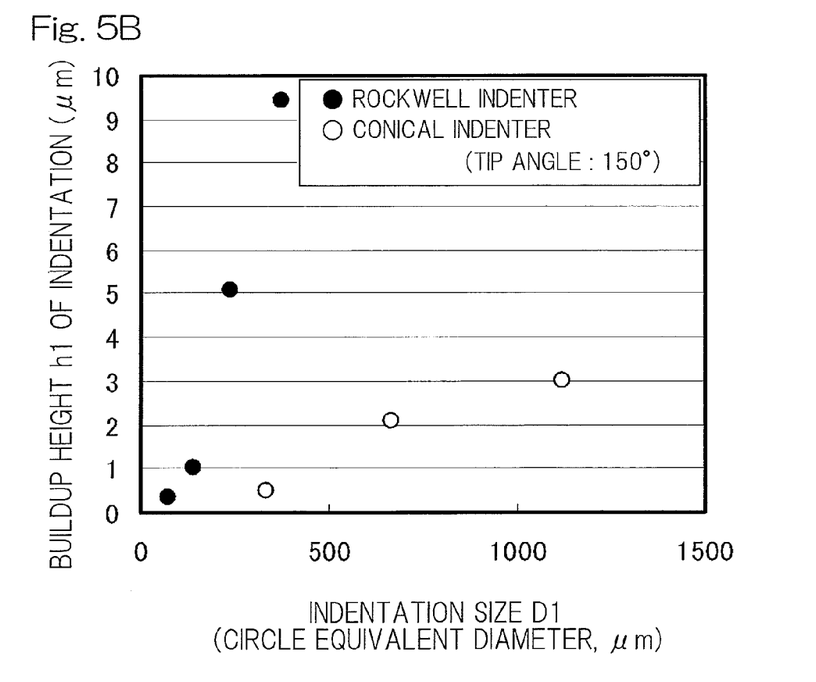
FIG. 5B is a chart showing the relationship between the indentation size and the buildup height of the indentation.

FIGS. 5A and 5B illustrate respective results of examination conducted to determine the relationship (shown in FIG. 5A) between the buildup height h1 of the indentation 14 and the depth h2 of the indentation 14 shown in FIG. 4B and the relationship (shown in FIG. 5B) between the indentation size D1, shown in FIG. 4B, and the buildup height h1 of the indentation 14, when the indentations of different shape, that is, the indentation 14, in which a Rockwell indenter has been pressed, and the indentation 14, in which a conical indenter has been pressed are formed in the rolling surfaces of respective SUJ 2 quenched and tempered products of the raceway rings. In those charts shown respectively in FIGS. 5A and 5B, black circles indicate the buildup heights h1 of the indentations 14 when the Rockwell indenter used during the Rockwell tests was pressed against the respective raceway surfaces of the raceway rings, while white circles indicate the buildup heights h1 of the indenters 14 when the conical indenter, tapered towards an indenter tip thereof and having the indenter tip angled at 150 degrees, was pressed against the respective raceway surfaces of the raceway rings. The axis of abscissas of the chart shown in FIG. 5B represents the indentation size D1, which is represented by a value calculated by correcting the planar indentation size to the diametric dimension of a circle equivalent.

As shown in FIG. 5A, the buildup height h1 of the indentation 14 shown in FIG. 4B had a propensity of linearly increase with increase of the depth h2 of the indentation 14 and such propensity did not change in dependence on the shape of the indentation. On the other hand, the relationship between the indentation size D1, shown in FIG. 5B, and the buildup height h1 of the indentation 14, although having shown a linear relation similar to that exhibited in FIG. 5A, was such that the indentation 14, formed by the Rockwell indenter pressed, and the indentation 14, formed by the conical indenter pressed showed different linear propensities. In other words, the relationship between the indentation size D1 and the buildup height h1 of the indentation 14 varied in dependence on the shape of the indentation.

The shape of the indentation 14 varies in dependence on the shape of the foreign matter and/or the rolling condition. Because of this, in order to estimate the buildup height h1 of the indentation 14 from the indentation size D1, relationships of the buildup height h1 from the indentation size D1 for each of the test conditions are necessary. In such case, the buildup height estimation unit 7 shown in FIG. 2 includes the storage section 7a for storing the relationship between the indentation size D1 in a particular condition of use of the bearing assembly and the buildup height h1 of the indentation 14 and the calculation section 7b for calculating the buildup height h1 of the indentation by comparing the inputted indentation size D1 with the previously described relation stored in the storage section 7a. The particular condition of use referred to above may include, for example, the radial load, the axial load, the rotational speed, ambient temperature, the type of a lubricant agent, and the presence or absence of a seal for sealing the lubricant agent.

It is to be noted that the storage section 7a shown in FIG. 2 may be replaced with the previously described preparatory information storage block 2B. If the depth of the indentation 14 can be measured from, for example, a replica of the rolling surface, the buildup height h1 of the indentation 14, a method of estimating it from the depth h2 of the indentation 14 is rather convenient. In such case, the buildup height estimation unit 7 includes the storage section 7a for storing the relationship between the depth h2 of the indentation 14 and the buildup height h1 of the indentation 14 and the calculation section 7b for calculating the buildup height h1 of the indentation 14 by comparing the measured depth h2 of the indentation 14 with the relationship stored in the storage section 7a.

From the foregoing, the buildup height estimation unit 7 in the calculation block 4 calculates the buildup height h1 of the indentation 14 by referring to the relationship stored in the storage section 7a (or the preparatory information storage block 2B) and shown in FIG. 5A or FIG. 5B. When the buildup height h1 is calculated as a value not greater than 1.0 μm, the lifetime estimation unit 8 calculates the lifetime $L_n$ of the rolling bearing assembly according to the formula (5) or the formula (6), setting the indentation correction coefficient $a_d=1$ expressed in the formula (4) or others. When the buildup height is calculated as a value greater than 1.0 μm by the buildup height estimation unit 7, the lifetime estimation unit 8 calculates the lifetime $L_n$ of the rolling bearing assembly according to the formula (5) or the formula (6) on the basis of the indentation correction coefficient obtained by substituting the indentation buildup height into the formula (4). In this way, the lifetime of the rolling bearing assembly, when the indentation 14 is formed in the raceway ring rolling surfaces 10a and 11a shown in FIGS. 6A and 6B, can be estimated from the estimated value of the buildup height h1 of the indentation 14 with the use of the formula (5) or (6).

The lifetime of the rolling bearing assembly that can be estimated by the previously described method is represented by the value applicable where only one indentation 14 is formed in the rolling surfaces 10a and 11a shown in FIGS. 6A and 6B. Where a large indentation 14 is formed in the rolling surfaces 10a and 11a or the number of the indentation 14 increases, it appears that the lifetime of the rolling bearing assembly is shortened because of an increase of the capacity that receives a load. In view of this, in order to take into consideration the capacity that receives the load, the estimated lifetime is corrected according to the following formula (7).

$$a_v = (1/n_d)^e \quad (7)$$

in which $a_v$ represents a correction coefficient necessitated by the indentation size and the number of indentations, $n_d$ represents the rate of increase of the surface area of the indentation buildup portion, and e represents the Weibull slope (e=10/9 in the case of the ball bearing assembly and e=9/8 in the case of the roller bearing assembly).

The foregoing formula (7) is illustrative of the correction of the estimated lifetime based on the Weibull theory according to which the lifetime decreases with an increase of the loaded volume onto the rolling surfaces 10a and 11a. Where the indentation 14 exists in a plural number or the indentations 14 of different sizes are formed, the lifetime estimation unit 8 includes the lifetime calculation section 8a for calculating the lifetime $L_n$ of the rolling bearing assembly by multiplying the formula (5) or the formula (6) by the correction coefficient according to the formula (7) above.

In the rolling surfaces of the rolling bearing assembly actually used, indentations of different buildup heights h1 of the indentation 14 are distributed. In order to take this into consideration, two concepts are needed in estimating the lifetime of the rolling bearing assembly. One of those concepts is that, on the assumption that the lifetime of the rolling bearing assembly is substantially determined by the indentation having the maximum buildup height h1, the estimated lifetime is corrected with due consideration paid to only the indentation 14 having the buildup height h1 near to the maximum value. The other concept is that, on the assumption that there is the probability of impairment against all of the indentations 14, the estimated lifetime is corrected with the aid of the probabilistic multiplication theorem so that all of those indentations 14 may be taken into account. Either of those concepts is effective to correct the estimated lifetime.

If the lifetime of the rolling bearing assembly is determined by the indentation 14 having the maximum buildup height, the lifetime estimating calculation section 8a calculates the lifetime $L_n$ of the rolling bearing assembly by multiplying the lifetime, estimated on the basis of the maximum buildup height h1 of the indentation 14, by the correction coefficient expressed by the formula (7) referred to above. In other words, it is acceptable to determine the lifetime Ln of the rolling bearing assembly by measuring the number of and the surface area of the indentation 14 having a buildup height h1 close to the maximum of the indentations and multiplying the formula (5) or the formula (6) by a correction coefficient of the formula (7) referred to above.

Where the bearing lifetime is to be determined in consideration with all of the indentations 14, the lifetime calculation section 8a corrects the estimated lifetime by measuring the lifetime according to the formula (5) or the formula (6) for each of the buildup heights h1 of the indentations 14 and substituting the lifetime, which is multiplied by the correction coefficient of the formula (7), in which influences of the number of indentations are taken into considered, into the following formula (8).

$$\left(\frac{1}{L}\right)^e = \sum_{i=1}^{I}\left(\frac{1}{L_i}\right)^e \quad (8)$$

in which L represents the lifetime with all of the indentations taken into consideration, $L_i$ represents the lifetime corresponding to the sum of the lifetimes of the indentations of the individual size to which the correction resulting from the number of the indentations is added, and e represents the Weibull slope (e=10/9 in the case of the ball bearing assembly and e=9/8 in the case of the roller bearing assembly).

It may occur that in the case of the rolling bearing assembly actually used, it is difficult in view of the structure of the bearing assembly to prepare respective replicas of the rolling surfaces 10a and 11a and, therefore, the depth of the indentation 14 cannot be measured. In such case, it is necessary to estimate the buildup height h1 by preparing database of indentation sizes D1 and buildup heights h1 of indentations 14 under particular conditions of use, observing the rolling surfaces 10a and 11a of the bearing assembly with the aid of a fiber scope and checking the indentation size D1 of the observed rolling surfaces 10a and 11a against the database.

Figure 7:
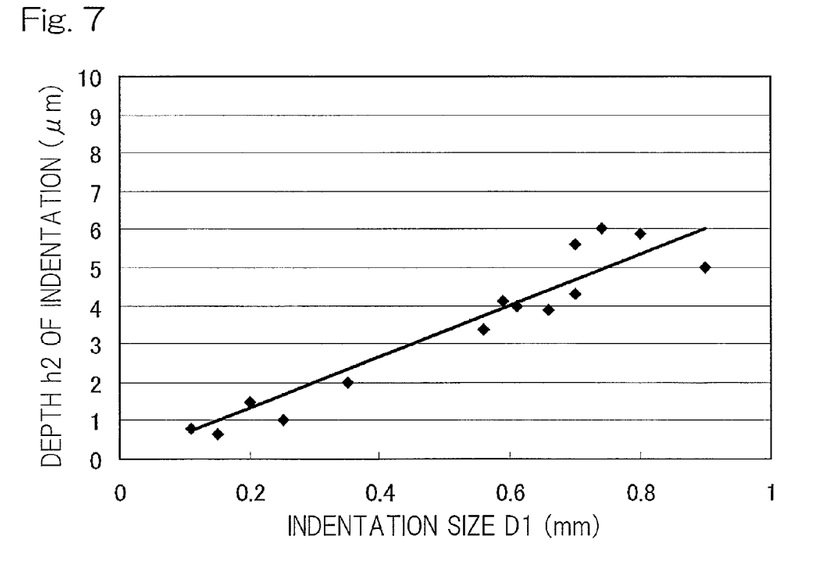
FIG. 7 is a chart showing the relationship between the indentation size and the depth of the indentation.

The chart shown in FIG. 7 illustrate a result of examination conducted to determine the relation between the indentation size D1 and the depth h2 of the indentation 14 in each of three bearing assemblies used under the same usage conditions. The axis of abscissas of the chart of FIG. 7 represents values of planar size of the indentations 14 which have been corrected into a diametric dimension of circle equivalents. As shown therein, although the number of the indentations 14 in those three bearing assemblies differed from each other, a substantially linear relationship was found in the relationship between the indentation size D1 and the buildup height h1 of the indentation 14. The database referred to previously is rewritably accommodated in the storage section 7a or the preparatory information storage block 2B. Accordingly, with no need to prepare the replicas of the rolling surfaces 10a and 11a, the buildup height estimation unit 7 can estimate the buildup height h1 easily by comparing the indentation sizes D1 of the observed rolling surfaces 10a and 11a with the database.

The method of estimating the remaining lifetime of the rolling bearing assembly then in service with the use of the previously discussed lifetime estimation method of the bearing assembly will now be described. In the case of the relatively expensive rolling bearing assembly of the large size, desires have been arisen to continue the use of the bearing assembly in reference to the result of estimation of the remaining lifetime made through regular inspections. The lifetime estimation unit 8 referred to above may include the remaining lifetime calculation section 8b for estimating the remaining lifetime of the bearing assembly from the estimated lifetime of the rolling bearing assembly and the number of rotations of the bearing assembly. In other words, the remaining lifetime calculation section 8b estimates the lifetime from the dynamic equivalent load and the buildup height h1 of the indentation 14 and estimates the remaining lifetime from the number of rotations of the bearing assembly. Since the lifetime of the rolling bearing assembly in most cases make use of $L_{10}$ (the number of rotations at which 90% of the rolling bearing assemblies do not fracture) as the standard, the difference between the $L_{10}$ and the number of rotations is typically employed as the remaining lifetime at that time. In the event that the timing, at which the remaining lifetime based on the parameter $L_{10}$ comes to represent a negative (−) value, is determined as the time of replacement of the rolling bearing assembly, 90% of the group of the rolling bearing assemblies being checked out may be regarded as acceptably operated. In the rolling bearing assemblies, there is an application thereof in which failure of a small percentage of the rolling bearing assemblies will come to a controversial issue. In this case, the cumulative failure probability may be set to a value lower than 10%.

Since no formation of the indentation 14 in the raceway ring rolling surfaces 10a and 11a at the start of use of the bearing assembly, with the indentation correction coefficient $a_d$ set to 1, the operation has to be continued until the remaining lifetime becomes a negative (−) value or until the next succeeding inspection. If the indentation 14 is found having been formed in the rolling surface at the time of inspection, the lifetime is estimated with the use of the indentation correction coefficient $a_d$ determined from the buildup height h1 of the estimated indentation 14, to thereby determine the remaining lifetime. Since at this time it is not apparent what stage the replica or the indentation 14, observed with the use of, for example, a fiber scope, has been formed, it is not possible to set the accurate number of rotations. If it is an idea for the security to replace the bearing assembly as soon as possible before it fractures, the number of rotations is employed in the form of the total number of rotations. If the remaining lifetime calculated on the assumption of the situation in which the indentation 14 has been formed does not become a negative (−) value, the operation is continued until the remaining lifetime becomes the negative (−) value or by the time the next succeeding inspection takes place.

If the operation of the bearing assembly continues by the time the next succeeding inspection takes place, an examination of the indentation shape takes place with the use of, for example, a replica or a fiber scope and others. Where the distribution of the indentations 14 are identical with that during the first examination, the lifetime is estimated with the use of the indentation correction coefficient $a_d$ determined during the previous inspection to thereby determine the remaining lifetime. Thereafter, the value of the indentation correction coefficient $a_d$ is estimated in reference to a newly formed indentation to thereby determine the remaining lifetime. Should either of those remaining lifetimes not become a negative (−) value, the operation is continued until the remaining lifetime becomes the negative (−) value or until the time the next succeeding inspection takes place. The procedures of estimating the remaining lifetime subsequent to the second inspection becomes similar to the procedure that has been described above. Although the above described remaining lifetime estimation has been described as being carried out when the load imposed on the bearing assembly is constant, the remaining lifetime is estimated using a linear accumulated failure rule, expressed by the following formula (9), if the load changes for each of the numbers of rotations.

$$\sum_{i=1}^{I} \frac{n_i}{L_i} = 1 \qquad (9)$$

in which I represents the number of steps of the load standard, $L_i$ represents the lifetime at the load level expressed by i, and represents the number of loads or the number of rotations at the load level expressed by i. If this formula is used, the timing at which the rolling bearing assembly is when the sum of $n_i/L_i$ attains 1.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Life estimation device
7 . . . Buildup height estimation unit
7a . . . Storage section
7b . . . Calculation section
8 . . . Lifetime estimation unit
8a . . . Lifetime calculation section
8b . . . Remaining lifetime calculation section
10 . . . Inner ring
11 . . . Outer ring
10a, 11a . . . Rolling surface
12 . . . Rolling element 14 ... Indentation
15 ... Buildup height portion
D1 ... Indentation size
h1 ... Buildup height of the indentation
h2 ... Depth of the indentation

What is claimed is:

1. A lifetime estimation device to estimate a lifetime of a rolling bearing assembly comprising inner and outer rings, each ring having a rolling surface defined therein, and a plurality of rolling elements rollingly interposed between the respective rolling surfaces of the inner and outer rings, the lifetime estimation device comprising:
   a buildup height estimation unit to receive at least one of an input indicating a depth of an indentation formed in one of the rolling surfaces of the inner and outer rings, and an input indicating an indentation size that represents a planar size of the indentation to estimate in accordance with a predetermined rule a buildup height of the indentation based on the inputted depth of the indentation or the inputted indentation size; and
   a lifetime estimation unit to estimate the lifetime of the rolling bearing assembly based on a relationship between a buildup height of the indentation and a ratio of reduction in a rolling fatigue life determined by tests conducted in advance, the estimated buildup height of the indentation and a dynamic equivalent load.

2. The lifetime estimation device for the rolling bearing assembly as claimed in claim 1, wherein the buildup height estimation unit comprises:
   a storage section to store a relationship between the indentation size and the buildup height of the indentation under particular conditions of use of the bearing assembly; and
   a calculation section to calculate the buildup height of the indentation by comparing the inputted buildup size with the relationship stored in the storage section.

3. The lifetime estimation device for the rolling bearing assembly as claimed in claim 1, wherein the lifetime estimation unit comprises:
   a lifetime calculation section to calculate the lifetime of the rolling bearing assembly by multiplying the estimated lifetime of the rolling bearing assembly by a correction coefficient of the rolling fatigue life depending on an increase of the surface area of the buildup portion of the indentation according to the formula $a_v=(1/n_d)^e$,
   wherein $a_v$ represents a correction coefficient depending on the indentation size and the number of the indentations, $n_d$ represents the rate of increase of the surface area of the buildup portion of the indentation, and e represents the Weibull slope,
   where $e=10/9$ if the rolling bearing assembly is a ball bearing assembly and $e=9/8$ if the rolling bearing assembly is a roller bearing assembly.

4. The lifetime estimation device for the rolling bearing assembly as claimed in claim 3, wherein the lifetime calculation section calculates the lifetime of the rolling bearing by multiplying the estimated lifetime, estimated based on the maximum buildup height of the indentation, by the correction coefficient.

5. The lifetime estimation device for the rolling bearing assembly as claimed in claim 3, wherein the lifetime calculation section calculates the lifetime of the rolling bearing assembly by estimating an individual indentation responsive lifetime for each indentation on the basis of the buildup height of all of the indentations formed on the rolling surfaces and then by multiplying the individual indentation responsive lifetime, which has been so estimated, by the correction coefficient.

6. The lifetime estimation device for the rolling bearing assembly as claimed in claim 1, wherein the lifetime estimation unit calculates the lifetime $L_n$ of the rolling bearing assembly according to formula $L_n=a_d a_1 (C/P)^p$,
   where $a_d=e^{(-b \times h)}$ and $a_1=[(\ln(1-0.01n)/\ln 0.9]^{1/e}$,
   where $L_n$ represents n % lifetime, $a_d$ represents an indentation correction coefficient, b represents a constant, h represents the indentation buildup height (μm), $a_1$ represents a reliability coefficient, P represents the load (kgf), C represents a dynamic load rating (kgf), p represents a loaded lifetime index, and e represents the Weibull slope,
   where p=3 and e=10/9 if the rolling bearing assembly is a ball bearing assembly, and
   where p=10/3 and e=9/8 if the rolling bearing assembly is a roller bearing assembly.

7. The lifetime estimation device for the rolling bearing assembly as claimed in claim 1, wherein the lifetime estimation unit calculates the lifetime $L_n$ of the rolling bearing assembly according to the formula: $L_n=a_d a'_1 (C/P)^p$,
   where $a_d=e^{(-b \times h)}$ and $a'_1=\{0.95 \times [\ln(1-0.01n)/\ln 0.9]^{1/e}+0.05\}$,
   where $L_n$ represents n % lifetime, $a_d$ represents an indentation correction coefficient, b represents a constant, h represents the indentation buildup height (μm), $a_1$ represents a reliability coefficient, P represents the load (kgf), C represents a dynamic load rating (kgf), p represents a loaded lifetime index, and e represents the Weibull slope,
   where p=3 and e=10/9 if the rolling bearing assembly is a ball bearing assembly, and
   where p=10/3 and e=9/8 if the rolling bearing assembly is a roller bearing assembly.

8. The lifetime estimation device for the rolling bearing assembly as claimed in claim 6, wherein the lifetime estimation unit, when the buildup height estimation unit estimates that the buildup height of the indentation is 1.0 μm or smaller, calculates the lifetime $L_n$ of the rolling bearing assembly with the correction coefficient $a_d$ being set to 1.

9. The lifetime estimation device for the rolling bearing assembly as claimed in claim 7, wherein the lifetime estimation unit, when the buildup height estimation unit estimates that the buildup height of the indentation is 1.0 μm or smaller, calculates the lifetime $L_n$ of the rolling bearing assembly with the correction coefficient $a_d$ being set to 1.

10. The lifetime estimation device for the rolling bearing assembly as claimed in claim 1, wherein the life estimation unit comprises a remaining lifetime calculation section to estimate a remaining lifetime of the bearing assembly from the lifetime of the rolling bearing assembly, which has been so estimated, and the number of rotations of the bearing assembly.

11. The lifetime estimation device for the rolling bearing assembly as claimed in claim 10, wherein the remaining lifetime calculation section determines that the remaining lifetime is zero revolution in the event of the number of rotations which exceeds the lifetime having a cumulative failure probability of lower than 10% or lower.

12. The lifetime estimation device for the rolling bearing assembly as claimed in claim 1, wherein the rolling bearing assembly is a tapered roller bearing assembly or a cylindrical roller bearing assembly.

13. A lifetime estimation method to estimate the lifetime of the rolling bearing assembly comprising inner and outer rings, each having a respective rolling surface defined therein, and a plurality of rolling elements interposed between the respective rolling surfaces of the inner and outer rings, comprising:
- estimating a buildup height by receiving at least one of an input indicating a depth of an indentation formed in one of the rolling surfaces of the inner and outer rings, and an input indicating an indentation size that represents a planar size of the indentation in accordance with a predetermined rule a buildup height of the indentation based on the inputted depth of the indentation or the inputted indentation size;
- determining in advance a relationship between a buildup height of the indentation and a ratio of reduction in a rolling fatigue life by conducting tests; and
- estimating the lifetime of the rolling bearing assembly based on the relationship between the buildup height of the indentation and the ratio of reduction in a rolling fatigue life, the estimated buildup height of the indentation and a dynamic equivalent load.

* * * * *